(12) United States Patent
Chen et al.

(10) Patent No.: US 7,418,454 B2
(45) Date of Patent: Aug. 26, 2008

(54) DATA OVERLAY, SELF-ORGANIZED METADATA OVERLAY, AND APPLICATION LEVEL MULTICASTING

(75) Inventors: Yu Chen, Beijing (CN); Zheng Zhang, Beijing (CN); Xing Xie, Beijing (CN); Shiding Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1113 days.

(21) Appl. No.: 10/826,674

(22) Filed: Apr. 16, 2004

(65) Prior Publication Data

US 2005/0243740 A1 Nov. 3, 2005

(51) Int. Cl.
*G06F 17/30* (2006.01)
*G06F 7/00* (2006.01)
(52) U.S. Cl. ...................................... 707/101; 707/102
(58) Field of Classification Search ................. 707/101, 707/102
See application file for complete search history.

(56) References Cited

U.S. PATENT DOCUMENTS

2005/0201278 A1* 9/2005 Banerjee et al. ............. 370/229
2005/0223102 A1* 10/2005 Zhang et al. ................ 709/228
2006/0218167 A1* 9/2006 Bosley et al. ............... 707/100
2007/0079004 A1* 4/2007 Tatemura et al. ............ 709/238

OTHER PUBLICATIONS

Dabek, et al., "Building Peer-To-Peer Systems With Chord, a Distributed Lookup Service", Hot Topics in Operating Systems, 2001, Proceedings of the 8th Workshop on May 20-22, 2001, Piscataway, NJ, USA, IEEE, May 20, 2001, pp. 81-86.
Misra, et al., "CLASH: A protocol for internet-scale utility-oriented distributed computing", Proceedings 24th International Conference on Distributed Computing Systems (ICDS'04), IEEE, Mar. 24, 2004, 9 pages.
Ratnasamy, et al, "A Scalable Content-Addressable Network", Computer Communication Review, ACM, NewYork, NY, US, vol. 31, No. 4, Oct. 2001, pp. 161-172.
Zheng, et al., "SOMO: Self-Organized Metadata Overlay of Resource Management in P2P DHT", Springer Verlag, Grlin, (online), vol. 2735, 2003, pp. 172-180.

* cited by examiner

*Primary Examiner*—Kuen S Lu
(74) *Attorney, Agent, or Firm*—Lee & Hayes, PLLC

(57) ABSTRACT

A data overlay is built as a data structure on a logical space defined by a distributed hash table (DHT) in a peer-to-peer network. The data overlay includes a tree having tree nodes that each have a zone mapped to a corresponding DHT node in the logical space of the DHT. The logical space of the DHT is mapped to machines, each of which corresponds to one or more of more of the tree node zones. The tree nodes are hierarchically situated by tree node zone size and my available resource so that tasks are performed by machines in the peer-to-peer network according to the respective abilities of the machines to supply the tasks' demand. The tree, which self-organizes and self-heals on the same scale as the underlying DHT, is used together and disseminate information from and to the DHT nodes using the hierarchy of the tree nodes.

40 Claims, 9 Drawing Sheets

DATA OVERLAY, SELF-ORGANIZED METADATA OVERLAY, AND APPLICATION LEVEL MULTICASTING

TECHNICAL FIELD

This invention relates to a distributed data structure and to a technique for utilizing the data structure to interact with a peer-to-peer system, as well as using the technique with application level multicasting.

BACKGROUND

Peer-to-peer (P2P) systems employ a network which connects participating machines having equal or similar capabilities and responsibilities. These systems perform tasks without the coordination of a conventional server (or with minimal set-up coordination by a server). For instance, FIG. 1 shows a high-level depiction of a P2P system 100. The system 100 includes a collection of peer entities (102-112) having equal or similar capabilities and responsibilities. In one example, the peer entities (102-112) may correspond to independent personal computer devices coupled together via an Internet or intranet. The peer entities (102-112) can directly transfer files or other information between themselves (as indicated by exemplary communication path 114) without the aid of a server. A general introduction to P2P systems can be found in D. S. Milojicic, V. Kalogeraki, R. Lukose, K. Nagaraja, J. Pruyne, B. Richard, S. Rollins, and Z. Xu., "Peer-To-Peer Computing," Technical Report HPL-2002-57, HP Lab, 2002.

P2P systems commonly use a distributed hash table (DHT) to facilitate the storage and retrieval of objects from peer entities participating in the systems. As the name suggests, a distributed hash table (DHT) refers to a hash table that is distributed over plural locations, such as distributed over plural stores associated with different computer devices. A distributed hash table specifies a plurality of DHT nodes having respective assigned IDs. The DHT nodes collectively define an abstract DHT logical space. An object can be inserted into or retrieved from this DHT logical space by subjecting this object to a hashing function to produce a key. This key is then used to locate a particular target node ID in the DHT logical space that will receive the object or from which the object can be retrieved. That is, each DHT node is associated with a range of keys; an object is added to or retrieved from a particular DHT node depending on whether the object's key falls within the range of keys associated with that particular DHT node. Unlike non-distributed hash table implementations, DHT nodes can freely join and leave the DHT logical space (e.g., corresponding to computer devices joining and leaving the P2P system, respectively), so functionality must be provided to address these events.

A variety of DHT strategies have been developed to manage the storage and retrieval of objects in a P2P system. FIG. 2 shows a Content Addressable Network (CAN) strategy, e.g., as described in S. Ratnasamy, P. Francis, M. Handley, R. Karp, and S. Shenker, "A Scalable Content-Addressable Network," ACM SigComm 2001, San Diego, Calif., USA, August 2001. This strategy models the DHT logical space as a D-dimensional Cartesian space 200. The CAN strategy partitions the space 200 as nodes join the DHT space 200. For instance, when node n1 joins, the CAN strategy allocates the entire space 200 to this node. When node n2 joins, the CAN strategy divides the space 200 into two halves and allocates each half to nodes n1 and n2, respectively. When node n3 joins, the CAN strategy divides the right half into upper and lower quarters, assigning the upper quarter to node n2 and the lower quarter to node n3. And when node n4 joins, the CAN strategy divides the lower right quarter into a left eighth (which is assigned to node n3) and a right eighth (which is assigned to node n4). This procedure is repeated as many times as necessary to dynamically account for nodes being adding and removed. The resultant partitions define logical spaces used to insert and retrieve objects into and from the distributed hash table. A node can be said to "own" the objects that map to its space.

FIG. 3 shows another strategy referred to as CHORD (e.g., as described in I. Stoica, R. Morris, D. Karger, M. F. Kaashoek, and H. Balakrishnan, "Chord: a Scalable Peer-To-Peer Lookup Service for Internet Applications," ACM SigComm 2001, San Diego, Calif., USA, August 2001. In this strategy, the DHT logical space is structured as circular space 300. DHT nodes are assigned IDs and added to the circular DHT logical space 300 based of their assigned IDs. For instance, exemplary DHT nodes n1, n2, n3, n4, and n5 shown in FIG. 3 have assigned IDs that govern their "placement" on the circular DHT logical space 300. As in the case of FIG. 2, the DHT nodes partition the DHT logical space 300 as they are added, defining multiple subspaces or zones. These zones define the objects that each node "owns." For instance, to insert an object into a distributed hash table that is governed by the DHT strategy shown in FIG. 3, the object is subjected to a hashing function to produce a key. The object is then stored at the DHT node have a zone assigned to that key (e.g., at the DHT node which encompasses a range of keys that include the object's key). In both the cases of FIG. 2 and FIG. 3, a variety of lookup strategies can be used to quickly find a particular node in the P2P system. In general, the lookup strategies involve making several "hops" in the DHT logical space to narrow in on the desired target DHT node. Various mechanisms are commonly provided to expedite this search. For instance, each DHT node in the CHORD strategy stores the IDs of a set of other DHT nodes. These other IDs can increase in exponential fashion, establishing so-called "fingers" that probe out into the logical space 300. This allows the lookup procedure to quickly locate a desired DHT node with a small number of hops.

FIGS. 2 and 3 provide merely a high level overview of two exemplary known DHT routing strategies. There are many other strategies. For instance, another popular routing strategy is the PASTRY routing strategy, as described in A. Rowstron and P. Druschel, "Pastry: Scalable, Distributed Object Location and Routing for Large-Scale Peer-To-Peer Systems," 18th FIFP/ACM International Conference on Distributed Systems Platforms (Middleware), Heidelberg, Germany, November 2001.

P2P systems offer many benefits over conventional client-server strategies. For instance, P2P systems have the ability to automatically and freely expand and contract without central coordination. But this lack of supervisory coordination also poses various challenges. For instance, it may be desirable to have the P2P system act in concert to perform some global function. In various instances, it may be desirable to collect data from the participants of the P2P system. Or it may be desirable to disseminate information to the participants in the P2P system. With a client-server approach, a server can simply poll its clients to collect information from its clients, or broadcast information to its clients to disseminate information to its clients. But data gathering and dissemination becomes more problematic in a P2P system because it is formed by a loose alliance of interconnected peers that can freely come and go. Adding centralized conventional reporting functionality may have the effect of complicating the P2P system, and thus reducing its flexibility and utility.

There is accordingly an exemplary need in the art for an efficient strategy for interacting with a P2P DHT that will allow, for instance, for the gathering of data from its participants and the dissemination of information to its participants. Moreover, it is desirable to efficiently organize the P2P DHT and interact with it in operations that will profit from its efficiency, such in an application level multicasting operation.

SUMMARY

According to one exemplary implementation, a method is described for building a data overlay. The method includes providing a distributed hash table (DHT) that governs the insertion and retrieval of objects into and from a peer-to-peer system, wherein the distributed hash table includes a logical space including a plurality of DHT nodes having an associated plurality of DHT zones. The method also includes building the data overlay as a data structure on top of the logical space of the distributed hash table by associating objects in the data structure with the DHT nodes, and by establishing links between the objects in the data structure. The data overlay has a topology of a tree, where the tree has tree nodes associated with respective DHT nodes. Each tree node has a respective tree node zone associated therewith which corresponds to a part of the logical space of the distributed hash table.

Machines are mapped to the logical space of the DHT. Each machine corresponds to one or more of more of the tree node zones. Each machine selects as its representative node, from the one or more tree node zones corresponding to it, the tree node corresponding to the largest size tree node zone. Each representative node selects as its parent node another representative node that is the representative node for an adjacent tree node zone that has a larger size.

After the machines are mapped to the logical space of the DHT, metadata can be gathering metadata at each machine. The gathered metadata can be sent from each machine to its representative node and those representative nodes can send the metadata so received to their respective parent node. The metadata received at the highest node in the tree (e.g., the root node) can be processed and sent to each machine via the respective parent and representative nodes. The meta data, for instance, can be information regarding the operation of each machine and the processed metadata can be instructions that can govern the operation of each machine.

Additional implementations and features will be described in the following.

BRIEF DESCRIPTION OF THE DRAWINGS

A more complete understanding of the implementations may be had by reference to the following detailed description when taken in conjunction with the accompanying drawings wherein:

FIG. 8*a* shows the building of a logical tree as a frame of reference, FIG. 8*b* shows the finding of representative virtual nodes, and FIG. 8*c* shows a mapping of the logical tree to physical machines.

FIG. 9*a* shows the bottom up SOMO depicted in FIG. 8*c*, FIG. 9*b* shows the addition of a physical machine for which a corresponding representative virtual node is found in the logical tree, and FIG. 9*c* shows a mapping of the revised logical tree to all of the physical machines.

Figure 1:
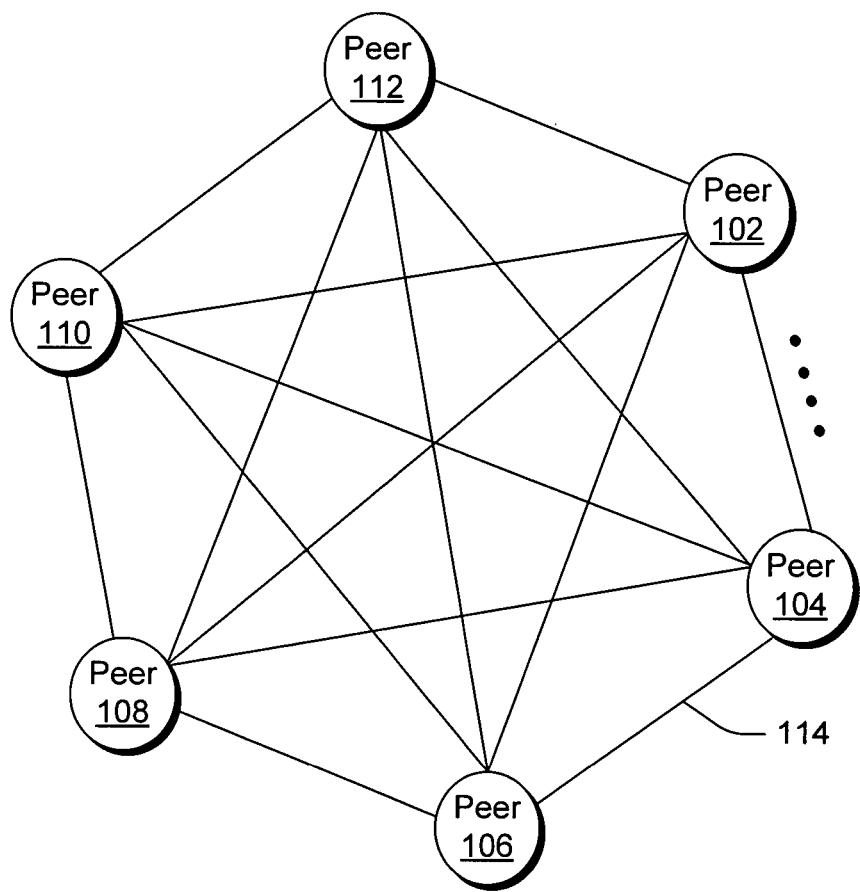
FIG. 1 shows a conventional peer-to-peer (P2P) system.
Figure 2:
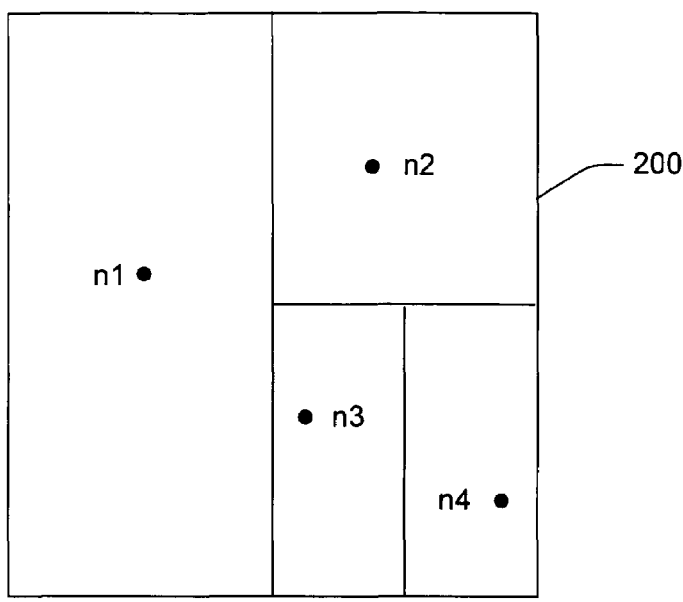
FIG. 2 shows a conventional CAN routing strategy.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The strategies described herein pertain to a data structure built "on top" of a distributed hash table (DHT) used in a peer-to-peer (P2P) system. The term peer-to-peer (P2P) system can describe any interconnection of participants in which the participants can directly interact with others, such as the interconnection network 100 shown in FIG. 1. In one implementation, the P2P system does not require the assistance of any server-type entities. The participants can include any kind of entity, including personal computers, laptop computers, personal digital assistants, application-specific computing devices, and so on. The participants can communicate with each other via any combination of routing infrastructure, such as hardwired and/or wireless communication routing mechanisms, various routers, gateways, etc. Further, the participants can communicate with each other through any combination of network protocols, such as TCP/IP (e.g., as provided by the Internet or an intranet).

More generally, any of the functions described herein can be implemented using software, firmware (e.g., fixed logic circuitry), manual processing, or a combination of these implementations. The term "logic" or "module" as used herein generally represents software, firmware, or a combination of software and firmware. For instance, in the case of a software implementation, the term "logic" or "module" represents program code that performs specified tasks when executed on a processing device or devices (e.g., CPU or CPUs). The program code can be stored in one or more computer readable memory devices.

This disclosure includes the following: Section A describes a general data overlay structure that can be built "on top" of a P2P DHT; Section B describes a Self-Organized Metadata Overlay, or "SOMO"; Section C describes applying the SOMO for gathering and dissemination of information in a P2P system; Section D describes Application Level Multicasting (ALM) using the P2P DHT; Section E describes using an exemplary P2P participant that can be used in the type of P2P DHT system with ALM as described in Sections A-D.

A. The Data Overlay Over a P2P DHT

Figure 3:
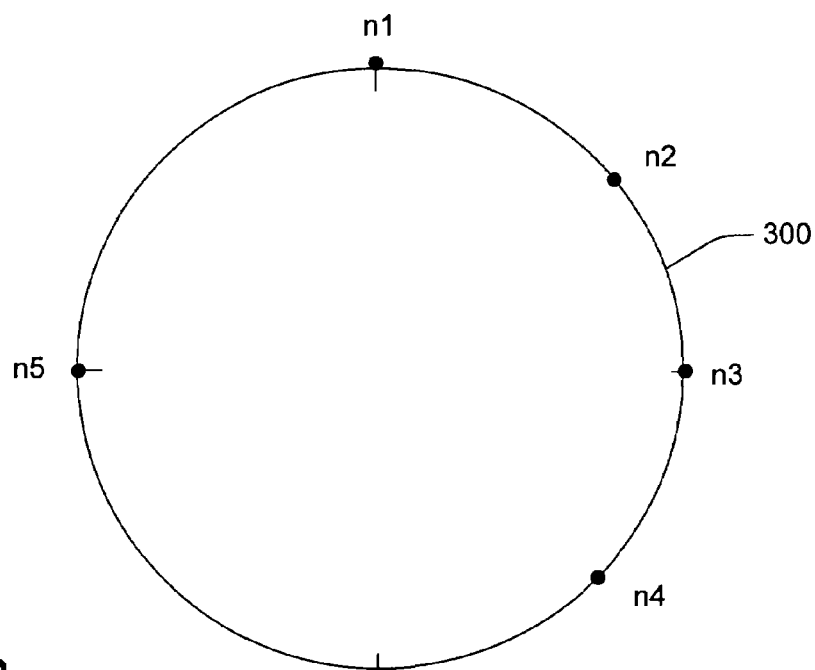
FIG. 3 shows a conventional CHORD routing strategy.

A data overlay is a data structure comprised of objects. The data structure is implemented "on top" of a distributed hash table. By way of background, DHT provides a technique for inserting objects into and retrieving objects from a distributed store provided by a P2P system. It performs this task by defining a collection of DHT nodes within a logical DHT space. That is, the DHT technique assigns each DHT node to a predetermined portion of the DHT logical space, referred to as the "zone" of the DHT node. For example, in the CHORD technique, a particular DHT node's zone can be interpreted as the span defined between that particular DHT node and its adjacent node in a circular DHT logical space (e.g., as shown in FIG. 3). An object is stored by hashing it to produce a key, and then using this key to associate the object with a particular node ID in the DHT logical space. The object is retrieved from the DHT logical space in a related manner. The associated zones ultimately map into real machines (e.g., computer devices and associated file storage systems), although there need not be a one to one relationship between nodes and machines.

Figure 4:
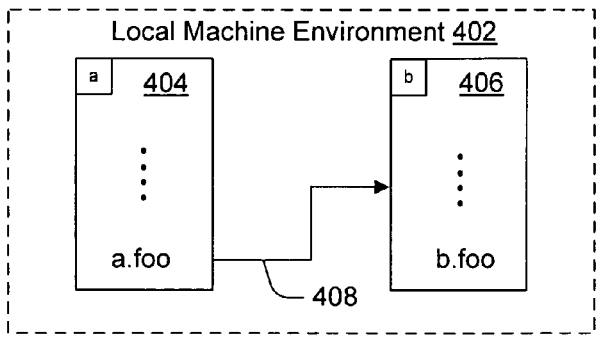
FIG. 4 shows a conventional technique for linking two objects of a data structure in the context of a local machine environment.

The data overlay is implemented "on top" of the DHT in the sense that its objects are associated with nodes in the DHT logical space. Further, an application traverses (or routes) from one object to another in the data overlay's data structure using the underlying protocols and services of the P2P DHT. More specifically, for frame of reference, consider the conventional case of FIG. 4 of a single machine environment 402. In this environment 402, a data structure includes two objects, a 404 and b 406, implemented in the storage provided by a single machine. An object broadly represents any unit of any type of information; in a conventional case, for instance, an object can correspond to a database record, e.g., a document. In the example of FIG. 4, object a 404 contains a pointer 408 that references object b 406.

Figure 5:
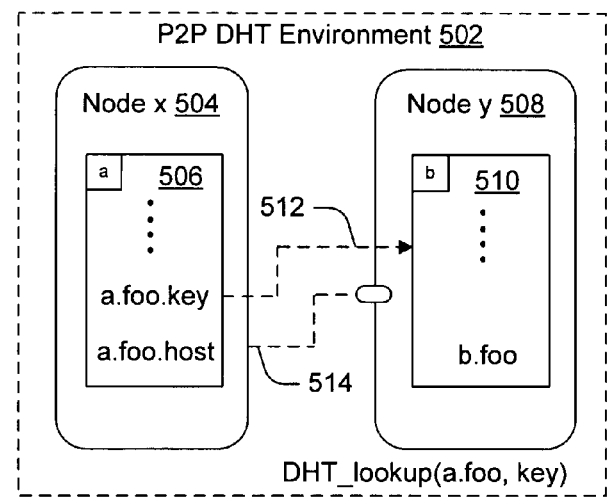
FIG. 5 shows an exemplary technique for linking two objects of a data structure in a P2P distributed hash table (DHT) environment, where the two objects are associated with two different nodes in the P2P DHT environment, and where the linking technique forms the basis of a data overlay placed "on top" of the DHT.

In contrast, FIG. 5 shows the implementation of a data overlay in the context of a P2P DHT environment 502. In this environment 502, since the objects are built "on top" of the DHT node framework already provided by the DHT, individual nodes in the DHT logical space "host" the objects in the data overlay. For example, DHT node x 504 hosts object a 506, and DHT node y 508 hosts object b 510. In this example, object a 506 references object b 510. Generally, object a 506 can link to object b 510 by storing the key that is used to access object b 510. This key is established when object b 510 is created. In the case of FIG. 5, however, the referencing scheme includes two fields. A first field 512 contains a hardwired address that points from object a 506 to object b 510. This field is referred to as a.foo.key. A second field 514 contains a soft-state reference that identifies the last known DHT node (e.g., node y 508) that hosts object b 510. This field is referred to as a.foo.host. The second field 514 thus serves as a routing shortcut to access object b 510.

Because the nodes of the data overlay can be dispersed over plural DHT nodes, the data overlay itself can be regarded as a distributed data structure. Although the data structure is distributed, it may be desirable to store it in such a manner that its objects are not unduly widely geographically dispersed. This can be achieved by generating the keys of a 506 and b 510 so that they are close to each other. This makes it more likely that the P2P DHT system will associate these keys with the same node in the P2P system or in closely related nodes in the P2P DHT system.

The data overlay also provides a collection of primitives used to manipulate pointers and objects in its data structure. More specifically, these primitives include a procedure (setref) for establishing a reference from object a to another object b, a procedure (deref) for returning an object pointed to by object a, and a procedure for deleting (delete) an object pointed to by object a.

Because the data overlay is implemented on top of the DHT system, its primitives use the DHT's services. For example, the primitives can use a DHT_insert service for inserting an object into the DHT logical space. The primitives can use a DHT_lookup service for using a predetermined DHT routing procedure to find an object based on its key in the DHT logical space (such as the exponential finger lookup structure used by CHORD). And the primitives can also use a DHT_direct procedure for directly accessing an object if the DHT node that stores the object is known in advance. In other words, DHT_direct bypasses the normal DHT_lookup routing procedure and directly seeks the node that hosts the object given its key. Both DHT_lookup and DHT_insert will, as a side effect, return the DHT node in the DHT that currently hosts the target object.

The data overlay can be implemented using its underlying DHT service by modifying whatever library routines are used to create objects so that these routines also establish the pointers described above as attributes of the objects. The library routines should also be modified to accommodate the primitives described above for setting a reference, returning an object pointed to by a reference, and deleting an object pointed to by a reference.

There are a number of advantages to building the data overlay on top of a DHT. For example, the DHT is designed to self-organize as DHT nodes are added to and deleted from the DHT logical space (related to real machines joining and leaving the P2P system, respectively). The DHT is also designed to automatically "heal" itself in response to DHT nodes being added to and deleted from the DHT logical space (such as by reestablishing links between nodes, transferring objects between nodes, etc.). By virtue of being implemented on top of the DHT, the data overlay can also adopt the features of self-organizing and self-healing. More specifically, the data overlay can be configured such that it is self-organizing and self-healing on the same scale as the underlying DHT.

Further, various applications can be ported to run on top of a P2P DHT, giving these applications the illusion of an infinite storage space (e.g., giving the impression of a single resource pool having a large size encompassing the nodes of the DHT logical space). This storage space can broadly include memory heaps of machines that are participating in the P2P DHT system. The host routing shortcut (e.g., a.foo- .host) makes the performance of applications utilizing the data overlay independent of the underlying DHT system.

In a DHT, a very large logical space (e.g., 160-bits) is assumed. Nodes join this space with random IDs and thus partition the spaced uniformly. The ID can be, for instance, a MD5 hash over a node's IP address. An ordered set of nodes, in turn, allows a node's responsible zone to be strictly defined. Let p and q be a node x's predecessor and successor, respectively. One definition of a node's zone is simply the space between the ID of its immediate predecessor ID (non-inclusive) and its own ID. In other words: $zone(x) \equiv (ID(p), ID(x)]$.

Figure 6:
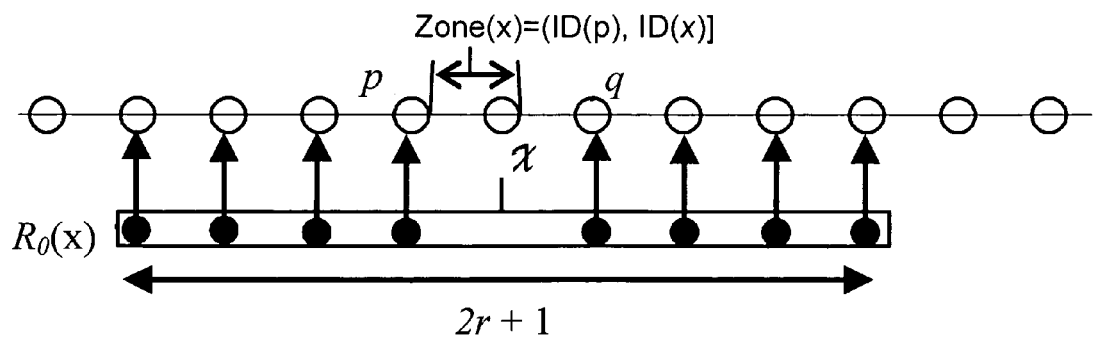
FIG. 6 shows a simple P2P DHT that includes a ring, a zone, and a basic routing table that records r neighbors to each side, where hashing assigns zones to DHT nodes.

FIG. 6 depicts a way to see a DHT as a logical space where each node occupies a logical position in the logical space, where the logical space is divided up. As such, each node needs to remember a few of its adjacent neighbors in order to make the logical space coherent. A new machine picks a random ID and joins the DHT. The new machine contacts any of the nodes, seeks to find a position, and then partitions the logical space for itself so that the tree self-organizes and is self-healing. The self-healing aspect occurs when a machine departs because its leaving is monitored by its adjacent neighbor machines, which departure is detected when the departing machine no longer sends a "heart beat" communication to indicate its presence. A new neighboring machine can then be taken on.

FIG. 6 can also be seen as depicting essentially how consistent hashing assigns zones to DHT nodes, where a ring, a zone, and a basic routing table are used. To harden the ring against system dynamism, each node records r neighbors to each side in the rudimentary routing table that is commonly known as a leaf-set. Neighbors exchange periodic communications to indicate their presence (e.g., "heartbeats"), as well as to update their routing tables when a node joins/leaves or when events occur. This base ring, seen in FIG. 6, is a simple P2P DHT. If one imagines the zone being a hash bucket in an ordinary hash table, then the ring is a DHT. Given a key in the space, one can always resolve which node is being responsible. The lookup performance is O(N) in this simple ring structure, where N is the number of nodes in the system.

Algorithms built upon the above concept achieves O(logN) performance with either O(logN) or even constant states (i.e., the routing table entries). Representative systems include the CAN partitioning scheme, the CHORD partitioning scheme, etc. The whole system of a DHT is self-organizing with an overhead typically in the order of O(logN). Also, a DHT is the virtualization of a space where both resources and other entities (such as documents stored in DHT) live together.

B. The SOMO Tree Structure; an Instance of the Data Overlay

The above described data overlay provides a framework for building an arbitrary data structure on top of a DHT. The data structure includes a plurality of objects which constitute nodes in the data structure. This data structure can assume any kind of topology by linking the nodes together in different ways. Further, the data structure can implement different functions depending on the operations assigned to its individual nodes. The following section described an exemplary instance of the data overlay referred to as a Self-Organized Metadata Overlay, or "SOMO" for brevity.

The SOMO data structure is constructed to assume the topology of a tree structure. The SOMO tree structure has a root node. The root node can have one or more children, which, in turn, can have their own respective children. The terminal nodes of the SOMO tree structure are referred to as leaf nodes. The leaf nodes are associated with respective DHT nodes in the DHT logical space of the P2P DHT system.

As will be described in greater detail below, one function of the SOMO tree structure is to extract metadata from the DHT nodes (which ultimately involves extracting data from the machines that implement the P2P system) and to pass this metadata up through the SOMO tree to the root node of the SOMO tree structure. An application can then read this metadata and perform some action on the basis of this metadata. (Metadata generally refers to any kind of information associated with the operations being performed in the P2P system, such as information regarding the performance of machines that comprise the P2P system). The SOMO tree structure can also be used to disseminate information from the root node of the SOMO tree structure down to the DHT nodes and associated machines within the P2P system. Thus, generally speaking, the SOMO tree structure can serve the role of data gathering (e.g., aggregation) and data broadcast.

Figure 7:
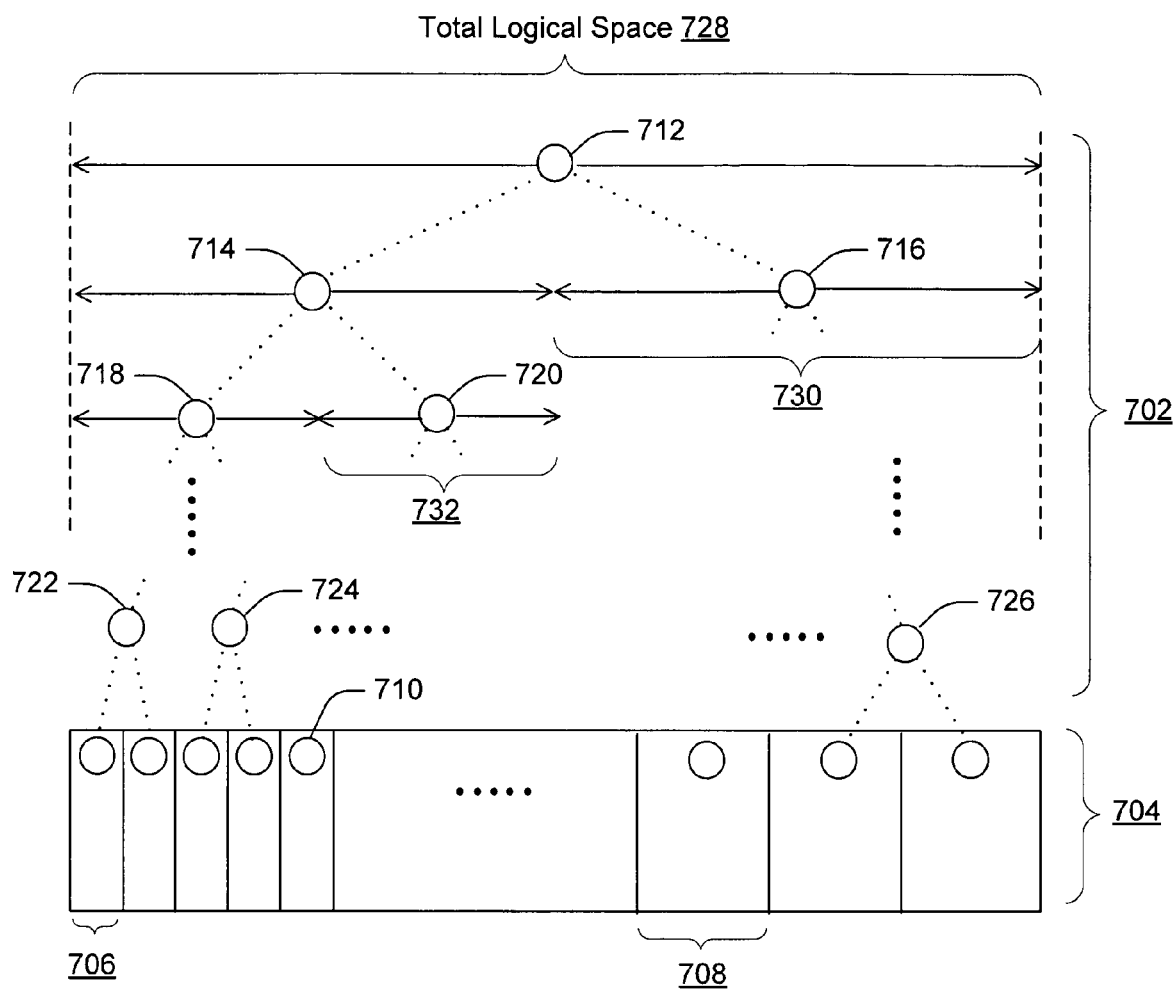
FIG. 7 shows an exemplary tree structure constructed using the concept of a data overlay depicted in FIG. 5, where the tree structure is referred to a Self-Organized Metadata Overlay (SOMO).

FIG. 7 illustrates an exemplary SOMO tree structure 702 that is built on top of an underlying DHT logical space 704. The DHT logical space 704 is partitioned into a number of zones, such as exemplary zone 706 and exemplary zone 708. Each zone includes a DHT node associated therewith, such as exemplary DHT node 710. The DHT can partition the DHT logical space 704 into zones according to any technique, such as exemplary techniques provides by the CAN partitioning scheme, CHORD partitioning scheme, PASTRY partitioning scheme, or any other kind of DHT partitioning scheme. For example, using the CHORD partitioning scheme, the DHT logical space 704 can be defined as a ring having nodes dispersed at various locations around it, and the zones can correspond to the spans that separate neighboring adjacent DHT nodes on the ring.

The SOMO tree structure 702 includes one or more nodes that are referred to here as "SOMO nodes" to distinguish them from DHT nodes. Each SOMO node is represented by symbol s. The exemplary SOMO tree structure 702 shown in FIG. 7 includes SOMO nodes s 712-726. The nodes s 712-726 form an inverted tree shape. Namely, a root node 712 branches off into child node 714 and child node 716. These child nodes can have their own respective child nodes; for example, child node 714 includes child node 718 and child node 720. Although the full structure of the exemplary SOMO tree structure 702 is abbreviated in FIG. 7 to facilitate illustration and discussion, the SOMO tree structure 702 ultimately terminates in leaf nodes (e.g., leaf nodes 722, 724, 726) planted in corresponding DHT nodes in the DHT logical space 704. In general, the links between the SOMO nodes in the SOMO tree structure 702 are illustrated in FIG. 7 by dotted lines that connect the SOMO nodes together; these links can be implemented using the referencing scheme described in "Data Overlay" Section above.

Each SOMO node s has a zone associated therewith. For example, the root SOMO node 712 includes a zone 728 that spans the entire DHT logical space 704. Child node 716 includes a zone 730 which spans one half of the root node 712's zone 728. Another child node 720 that is deeper in the SOMO tree structure 702 has a zone 732 that is one quarter of the root node 712's zone 728. Accordingly, successive nodes s added to the hierarchy of the SOMO tree structure 702 result in progressively finer partitioning of the root node 712's zone 728. Also, the hierarchy of the SOMO tree structure 702 grows "taller" for those regions of the DHT logical space 704 that exhibit finer (that is, denser) partitioning of the space 704. In general, FIG. 7 represents the zones associated with individual SOMO nodes by horizontal arrows that span the length the SOMO nodes' respective zones. A DHT node that hosts a particular SOMO node s is expressed as DHT_host(s).

As was described above, to complete a P2P resource pool, a DHT should be augmented with an in-system monitoring infrastructure because, for a large system, it is impractical to rely on an external monitoring service. Such an infrastructure must satisfy a few key properties: (1) be self-organizing at the same scale as the hosting DHT; (2) be fully distributed and self-healing; and (3) be as accurate as possible with respect to the metadata gathered and disseminated. The SOMO proposed herein is built from the bottom-up as described below.

The monitoring infrastructure can take a number of topologies. For the sake of the resource pool, one of the most important functionalities is aggregation. Therefore, the SOMO is a tree of k degree whose leaves are planted in each DHT node. Information is gathered from the bottom and propagates towards the root. Thus, one can think of SOMO as doing a 'converge cast' from the leaves to the root, and then (optionally) broadcasting back down to the leaves again. Both the gathering and dissemination phases are $O(\log_k N)$ bounded, where N is total number of objects. Each operation in SOMO involves no more than k+1 interactions, making it fully distributed. By using the principle of soft-state, data can be regenerated in $O(\log_k N)$ time. The SOMO tree self-organizes and self-heals in the same time bound. In a way, SOMO can be thought as a responsive "news broadcast" whose construction and processing are shared by all the nodes. The on-time, global "news" is what creates the illusion of the resource pool.

B.1 Building the SOMO

The core idea of SOMO is that, instead of working with each of a plurality of individual machines and configuring them into a hierarchy, a tree is "drawn" in a logical space first, and then a map is made from the logical tree to actual machines.

As mentioned above, the data overlay can grow and shrink as a function of dynamic and unsupervised modifications made in the underlying DHT. Since the SOMO tree structure 702 is an instance of the data overlay, this means that the SOMO tree structure 702 also has the ability to grow and shrink in response to modifications made to the underlying DHT. Also, the SOMO tree structure, like its underlying DHT, has the ability to heal itself to counteract modifications in the underlying DHT. The following subsection describes the manner in which the SOMO tree structure 702 evolves in response to changes in its underlying DHT.

B.2 Building the Logical Tree

Figure 8A:
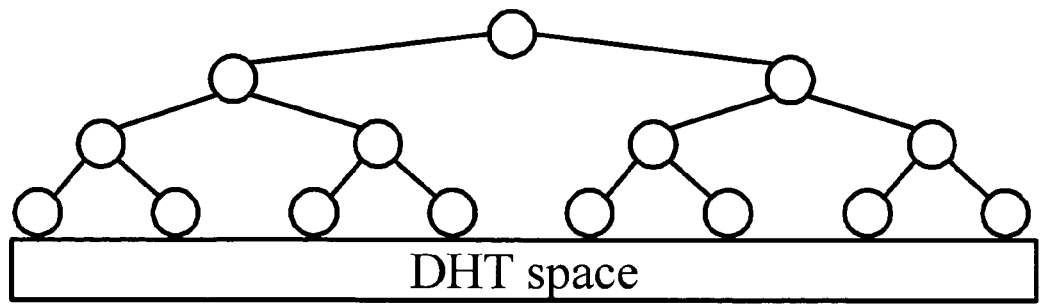
FIGS. 8*a*-8*c* depict progressive schematic views of a process for building a SOMO from the bottom up, where
Figure 8A:
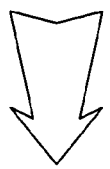

The logical tree acts as a reference framework that helps all the machines in the P2P pool to organize into a hierarchy in a fully distributed and automatic manner. It is composed of a set of virtual nodes each of which has a key as shown in FIG. 8a, which also determines its position in the one dimensional DHT logical space.

Figure 8B:
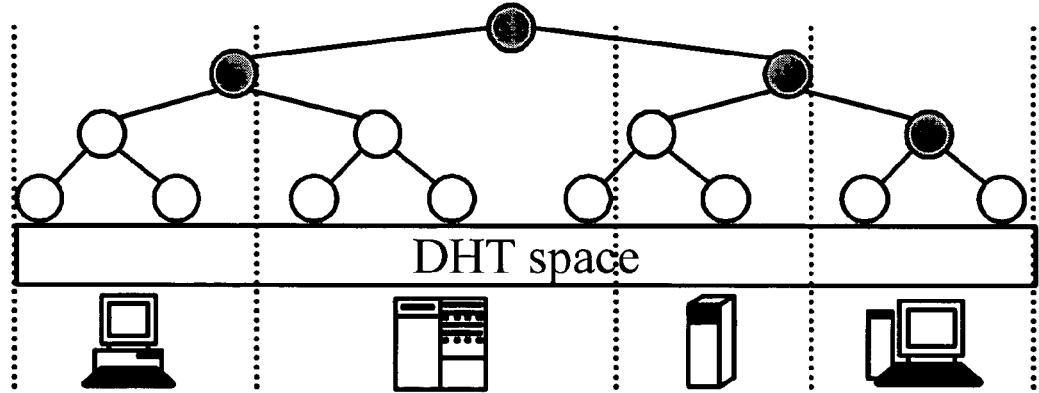
Figure 8B:
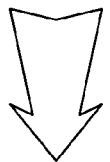
Figure 8C:
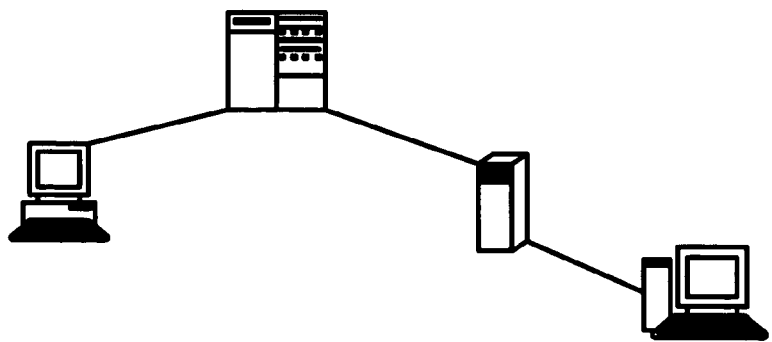

The first invariant of building the tree is that each virtual node owns a portion of the space; and the key of the virtual node is the center of the sub-space it owns. Suppose the DHT logical space is [0, 1], then the root virtual node's key is 0.5. Then the space of the root virtual node (the whole logical space at this point) is divided into k sub-spaces evenly, and each sub-space is covered by a virtual node at level-1. Applying this dividing process recursively, a logical tree is constructed. Therefore, level-i contains totally $k^i$ virtual nodes, where each virtual node owns a $1/k^i$ size sub-space. Specifically, the j-th ($0<=j<2^i$) virtual node at level-i owns a space of $[j/k^i, (j+1)/k^i]$, and is keyed/positioned at $(2j+1)/2k^i$, where 'k' is the degree and 'i' is the level . . . . Accordingly, an exemplary procedure is seen in FIGS. 8a-8c for building a bottom up SOMO tree structure.

B.3 Mapping to a Physical Tree

The physical tree is built when each machine in the P2P environment finds its parent machine. This can be accomplished in a fully distributed way by leveraging the logical tree constructed above. Since all the machines have the whole knowledge of the logical tree, using a level-order tree traversal algorithm, each machine selects the highest virtual node that falls into its zone. This virtual node represents this machine in the final physical tree, and as such it can be called the representative node or repre(x) for machine x. The deterministic nature of the logical tree means that x can compute the key of the parent virtual node of repre(x). Using a DHT lookup, x finds the machine y that hosts that key and establishes connection to y, as shown in FIG. 8b. Every machine executes the same procedure, with purely local knowledge (the zone and the deterministic logical tree topology). All child-parent connections are identified by a pair of logical keys: the representative virtual node that falls on the child machine and the corresponding parent virtual node that falls on the parent machine. The connection is maintained using heartbeats and the above invariant is kept all the time. For instance, if x's zone splits because a new neighbor joins, x will break all connections whose parent-end points no longer belong to its zone. At this point, machines on the other end of the connections will re-establish their parent machines by an execution of the same procedure outlined earlier, and thereby the topology self-heals—an example of which is seen by the exemplary procedure depicted in FIGS. 9a-9c.

The foregoing procedure can be understood as the mapping of machines to the logical space of the DHT. Each machine corresponds to one or more of more of the tree node zones. Each machine selects as its representative node, from the one or more tree node zones corresponding to it, the tree node corresponding to the largest size tree node zone. Each representative node selects as its parent node another representative node that is the representative node for an adjacent tree node zone that has a larger size. An exemplary procedure for the selection of representative and parent nodes, including the root node, is seen in FIGS. 8a-8c. As shown in FIG. 7, the size of the tree node zone decreases with increasing the level of the tree, where the first level is that of the root node which has a tree node zone corresponding to the entire span of the logical space of the DHT.

The foregoing procedure organizes the physical machines into a tree in a fully distributed manner. Furthermore, with high probability, the tree is k-degree and balanced. The definition of the representative virtual node is that it is the highest virtual node that falls into a machine's zone. Every machine is connected since the parent virtual node resides on some other machine. The resulting graph does not have any loop because that would violate the definition of the representative virtual node. Thus, it must be a tree. The logical tree topology is deterministic, and the only other input a machine needs is its own zone in the DHT space. Thus, the tree building is fully distributed. The logical tree is a k-degree balanced tree. Whether the physical tree is also k-degree and balanced is chiefly determined by the zone distribution. Since a machine's ID in the DHT is randomly generated, with high-probability, the resulting tree is k-degree and balanced.

Figure 9A:
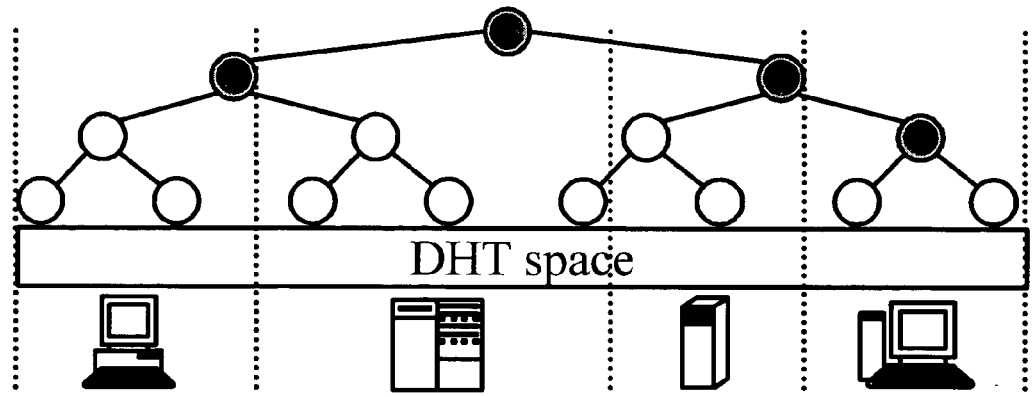
FIGS. 9*a*-9*c* depict progressive schematic views of a self-scaling process for healing the bottom up SOMO depicted in FIG. 8*c*, where
Figure 9B:
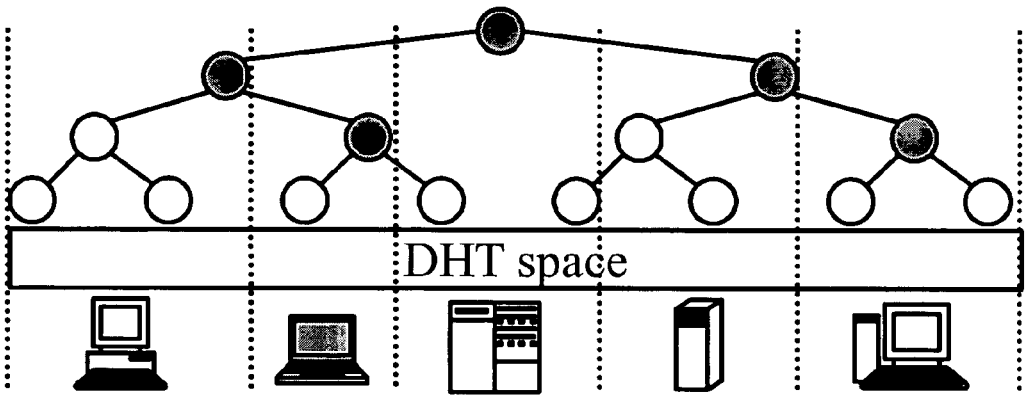
Figure 9C:
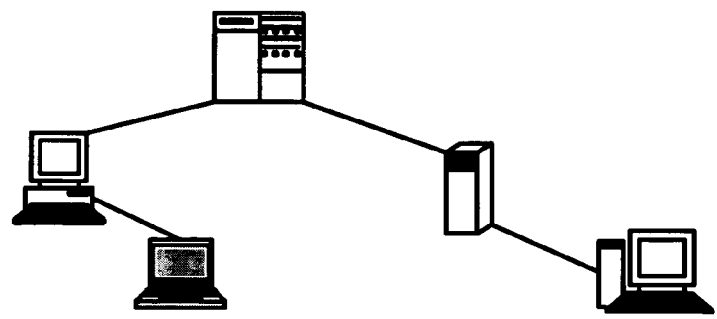

SOMO can deal with changes of membership automatically and with minimum overhead because each connection is decided by a pair of logical points: the first point of which is the representative virtual node and is determined by its DHT zone, and the second point of which is also deterministic given the first. Thus, as long as this invariant is kept, the topology can be re-established whenever there are membership changes. As a result, the SOMO tree grows when new members join the pool, and shrinks when peers depart as shown by FIGS. 9a-9c. Accordingly, an exemplary procedure is seen in FIGS. 9a-9c for healing the bottom up SOMO tree structure.

If it is desired to place a machine having the most capabilities at the top of the logical tree, the node ID can be changed to be other than randomly generated. An upward merge-sort is then made through the SOMO to identify the most capable node. This node then exchanges its ID with the node that currently possesses the root logical point of SOMO (i.e., 0.5 of the total space [0, 1]), and this effectively changes the machine that acts as the root without disturbing any other peers. This self-optimizing property is made possible by operating in the logical space first.

C. Metadata Aggregation and Dissemination

SOMO as an infrastructure neither imposes on what data is to be gathered nor imposes on the operation invoked to process the gathered data. For the sake of building a resource pool, each machine simply collects its resource metrics, combines its resource metrics with what it received from its children nodes, and then merges these to its parent node. The data that are passed around should be soft-state. Also, as an optimization, reports can be in the fashion of 'delta' of consecutive reports.

The performance of SOMO is determined by the height of the physical tree, which is in turn determined by the parameters (i.e., k) of the logical tree and the distribution of DHT nodes in the logical space. Since node ID is random, the height of physical tree is $O(\log_k N)$. Therefore, given a data reporting interval T, information is gathered from the SOMO leaves and flows to its root with a maximum delay of $\log_k N \cdot T$. This bound is derived when flow between hierarchies of SOMO is completely unsynchronized. If the upper SOMO nodes' call for reports immediately triggers the similar actions of their children, then the latency can be reduced to $T + t_{hop} \cdot \log_k N$, where $t_{hop}$ is average latency of a trip in the hosting DHT. The unsynchronized flow has a latency bound of $\log_k N \cdot T$, whereas the synchronized version will be bounded by T in practice (e.g., 5 minutes). Note that $O(t_{hop} \cdot \log_k N)$ is the absolute lower bound. For 2M nodes and with k=8 and a typical latency of 200 ms per DHT hop, the SOMO root will have a global view with a lag of 1.6 s.

C.1 Applying the SOMO Tree Structure

As described above, one exemplary use of the SOMO tree structure 702 is to gather information from the physical machines in the P2P system that are represented by the DHT logical space 704. Another exemplary use of the SOMO tree structure 702 is to disseminate information to those physical machines. The information collected can be metadata. Metadata describes information regarding the operation of the P2P system, such as information that reflects the behavior of its physical machines. The information that is disseminated to the physical machines can represent instructions that can govern the operation of the physical machines. One can thus interpret the SOMO mechanism as performing a converge cast from the SOMO leaf nodes to the SOMO root node to provide data gathering, and then performing a multicast back down to the SOMO leaf nodes to provide data dissemination.

Figure 10A:
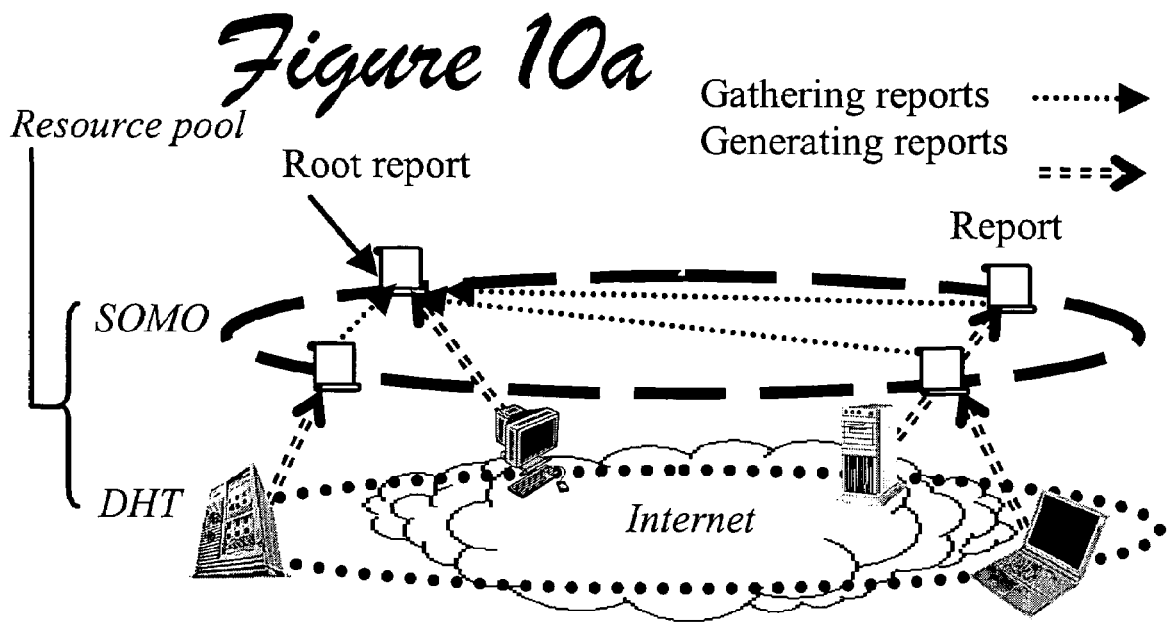
FIG. 10*a* shows the combination of the capabilities of a DHT for pooling resources and a bottom up SOMO to collectively make a resource pool.

FIG. 10a shows that the combining of DHT's capability of pooling resources with a SOMO collectively makes a P2P resource pool that is composed of a DHT and a SOMO. As a recap, the DHT is used not in the sense of sharing contents, but rather is used as an efficient way to pool together a large amount of resources, with little or no administration overhead and no scalability bottleneck. SOMO is a self-organizing "news broadcast" hierarchy layered over a DHT. Aggregating resource status in O(logN) time then creates the illusion of a single resource pool. The procedure seen in FIG. 10a depicts the registration of the resources pair-wise, the gathering of statistics, an aggregation of the gathered statistics into a snapshot, and then ensuring that the resulting dynamic database can be queried by applications. The scale and composition of P2P resources requires that every layer be completely self-organizing, self-scaling, and self-healing so that there will be little administration overhead.

Figure 10B:
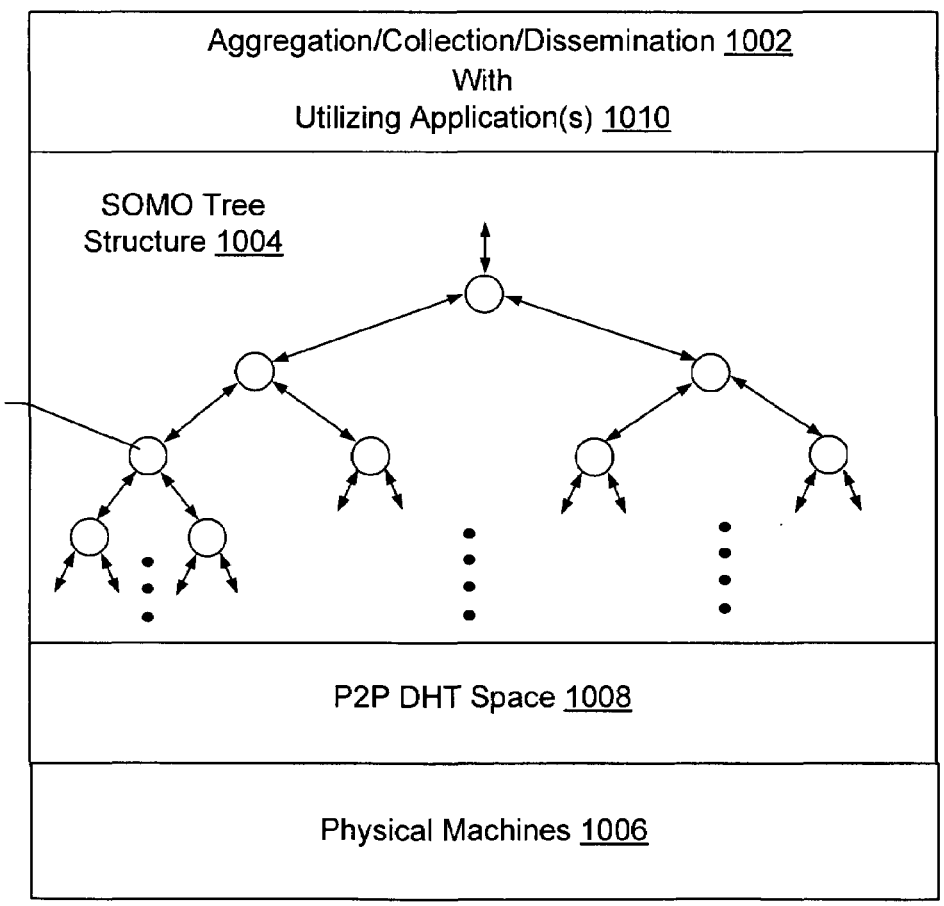
FIG. 10*b* shows an exemplary application of the SOMO tree structure of FIG. 7 to the collection of information from, and dissemination of information to, the participants of the P2P system.

For example, FIG. 10b represents a scenario 1002 in which a SOMO tree structure 1004 is being used to collect information from physical machines 1006 in the P2P system via the DHT logical space 1008. More specifically, the leaf SOMO nodes retrieve the required information from their hosting DHT nodes. (As a side-effect, this procedure can also restart a child SOMO node if it has disappeared because its hosting DHT node has crashed). One or more applications 1010 can invoke this gathering operation for any defined purpose (such as for the purpose of performance monitoring, that is, collecting information regarding various loads and capacities of the physical infrastructure that comprises the P2P system).

More specifically, FIG. 10b depicts the configuration of the SOMO tree structure 1004 to gather information by showing lines having arrows that point upwards from each SOMO node to its corresponding parent SOMO node. In this manner, information funnels up the SOMO tree structure 1004 from its leaf SOMO nodes to its root SOMO node. The application(s) 1010 can extract a complete report from the root SOMO node that culls information from the entire P2P system. This report can contain raw unorganized data. Alternatively, this report can contain merged and sorted data provided that the SOMO nodes have been configured to perform this function before passing the information that they collect onto to their corresponding parent SOMO nodes. The SOMO nodes can be configured to perform this task by configuring an 'op' member to perform merging and sorting. For example, the member op can define an operation that the particular SOMO node can perform on information that passes through it (in either a data gathering or data dissemination mode.). For example by reference to FIG. 7, the op can specify that a merge-sort operation is to be performed in the course of collecting information using the SOMO tree structure 702. By virtue of the inclusion of the op member, the SOMO tree structure 702 can execute any functionality in a distributed and parallel manner. Thus, the SOMO tree structure 702 can also be viewed as a mechanism for providing a distributed parallel processing framework to implement any kind of functionality. This is merely one illustrative example. The SOMO nodes can execute other operations on the information as it passes through the SOMO nodes on its way to the root SOMO node, such as various arithmetic operations.

The following pseudo-code provides one technique for gathering information using the SOMO tree structure 1004:
Pseudo-Code: SOMO gathering procedure:

```
get_report (SOMO_node s) {
    Report_type rep[1..k]
    for i∈[1..k]
        if (s.child[i] ≠ NULL)    // retrieving via DHT
            rep[i] = deref(s.child[i]).report
    s.report = s.op(rep[ ])
}
```

To gather system metadata, the SOMO nodes can periodically perform the above procedure by requesting reports from their respective children. The gather procedure can be tuned to extract specific information from the SOMO tree structure 1004. More specifically, the hierarchical nature of the SOMO tree structure 1004 facilitates the use of complex range queries to discover information relevant to a given logical DHT space region. For example, if k is 2, and it is desired to retrieve a status report of the first quarter of the DHT logical space, an application 1010 need only obtain a report from the left child SOMO node 1012 of the second-level SOMO tree structure 1004. Another useful implementation involves registering queries at SOMO nodes, which essentially transforms the SOMO mechanism into a publish-subscribe ("pub-sub") infrastructure.

FIG. 10b also shows that a scenario 1002 in which the SOMO tree structure 1004 is being used to disseminate information to physical machines 1006 in the P2P system via the DHT logical space 1008. One or more applications 1010 can invoke this dissemination operation for any defined purpose (such as for disseminating instructions to the physical machines 1006). The configuration of the SOMO tree structure 1004 to disseminate information is represented in FIG. 10b by showing lines having arrows that point downward from the parent SOMO nodes to their respective child SOMO nodes. In this manner, information propagates down the SOMO tree structure 1004 from its root SOMO node to its leaf SOMO nodes. The information can be propagated through the branches of the SOMO tree structure 1004 without modification by the SOMO nodes. Alternatively, by virtue of their op member, the SOMO nodes can perform any kind of operation on the information before it is passed to their associated child SOMO nodes. Also, as described for the case of data gathering, it is possible to disseminate information to only parts of the DHT logical space 1008 by involving only selected branches of the SOMO tree structure 1004.

D. Application Level Multicasting (ALM)

Figure 11A:
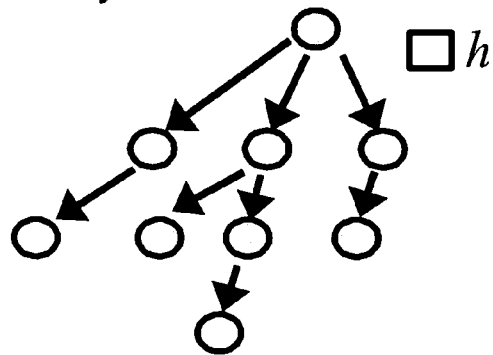
FIG. 11*a* depicts a schematic arrangement for application level multicasting.
Figure 11B:
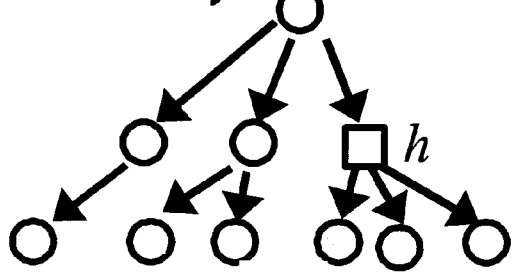
FIG. 11*b* shows an improvement upon the arrangement seen in FIG. 11*a* by the use of a helper node in a resource pool, where circles represent original members of an application level multicasting session and a square represents an available peer having a large degree.

Additional applications and variations of the data overlay and SOMO tree structure can be implemented. For example, in one exemplary implementation, the SOMO mechanism can be used with Application Level Multicasting (ALM) by providing algorithms that act on the metadata that is gathered from the SOMO tree structure, or which generate the information that is propagated down through the SOMO tree structure. ALM techniques can be implemented by providing suitable functionality in the application(s) 1010 shown in FIG. 10b. By way of example, FIGS. 11a-11b shows schematic arrangements for ALM.

The availability of a P2P resource pool offers optimization possibilities. As shown in FIGS. 11a-11b, an optimization can be made when an otherwise idle but suitable helping peer is identified. Once the suitable peer has been identified, it can be integrated into a topology with better performance. Thus, FIG. 11b shows an improvement upon the arrangement seen in FIG. 11a. The improvement is made by the use of a helper node in a resource pool. In FIGS. 11a-11b, circles represent original members of an application level multicasting session and a square represents an available peer having a large degree. The optimization can be directed towards a market demand system such that the most resource hungry task will be performed by the most resource available machines in the peer-to-peer system.

D.1 Generating Resource Metrics for ALM

For many P2P applications, resource statistics include not only CPU loads and network activities but also more complex resource statistics that can not be derived locally from the machine. A case in point is ALM. Suppose it is desired to schedule a session and a large list of potential helping peers have been acquired by querying SOMO, then one peer must be selected that is nearby and also has adequate bandwidth. If only the peers' IP addresses are given, the process of pinging over them to find their vicinity is both time-consuming and error-prone. The following discussion will focus on the metrics of IP address and bandwidth as an alleviation of this problem. It will be explained how these attributes can be generated by leveraging the interactions among DHT nodes that maintain the logical space integrity.

D.2 Node Coordinate Estimation

In order to find a coordinates-based latency estimation, latency(x, y), it is sufficient to compute distance(coord(x), coord(y)), where coord is a network coordinate in a d-dimension Euclidean space. Each node must provide its heartbeats with its leafset nodes in order to collectively maintain the DHT space. If each node randomly chooses to acknowledge the heartbeat message from nodes in its leafset, then over time it will have a measured delay vector, $d_m$, to its leafset neighbors. In the heartbeat message, each node also reports its current coordinates. Thus, a predicted delay vector $d_p$ is available locally as well. Node x updates its own coordinates by executing a downhill simplex algorithm, and minimizing the function:

$$E(x) = \sum_{i=1,r} |d_p(i) - d_m(i)|.$$

The optimization is done locally and it only updates x's own coordinates, which will be distributed to x's leafset neighbors in subsequent heartbeats. This procedure is executed by all nodes periodically, where the node coordinates and the measured and predicted delay vectors are being updated continuously.

D.3 Bottleneck Bandwidth Estimation

Network bandwidth of a peer is another important metric for many applications running on top of a P2P resource pool in that there is a correlation between bottleneck bandwidth and throughput. Therefore, the bottleneck bandwidth can serve as a predictor for throughput. It may be assumed that a bottleneck link lies in the last hop. For each node, its upstream bottleneck bandwidth is estimated as the maximum of the measured bottleneck bandwidths from the node to its leafset members, which are limited by both the node's uplink bandwidth and the downlink bandwidths of the leafset nodes. The basic idea is that if there is one neighbor with downlink bandwidth greater than the node's uplink bandwidth, the estimation is accurate. So with more leafset nodes the chance of getting an accurate estimation would be better. For the same reason, the node's downstream bottleneck bandwidth is estimated as the maximum of the measured bottleneck bandwidths from its leafset nodes to itself.

Measuring bottleneck bandwidth is well understood. For instance, in a packet-pair technique, two packets of size S are sent back-to-back from a source node. The receiver measures the time dispersion T in between and estimates the bottleneck bandwidth from the source as S/T.

The cooperation of leafset nodes over heartbeats enables packet-pair technique to be naturally deployed. Periodically, a node x chooses to send a neighbor y two consecutive heartbeat messages back to back, padding each so that their size is sufficiently large (say 1.5 KB). 'y' now has the estimation of the bottleneck bandwidth on the path from x to itself. This value will be piggybacked in the next heartbeat to x. Likewise, y does the same probing as x. After x collects enough measured bandwidths from its leafset members, it can now estimate its own bottleneck bandwidth as above.

D.4 Scheduling ALM Sessions Within P2p Resource Pool

It will now be demonstrated how to utilize a P2P resource pool optimally for multiple simultaneous ALM sessions. The end goal is for active sessions to achieve optimal performance with all available and adequate peers in the resource pool. A session's performance metrics is determined by certain QoS definitions. Moreover, higher priority sessions should proportionally acquire a greater share of the pooled resources. Here, an emphasis is placed on small-to-medium session size where it is believed that QoS is often a requirement (e.g., video-conference). It is also assumed that there is a static membership, where the original set of participants is denoted as M(s) for a given session 's', though the algorithm can be extended to accommodate dynamic membership as well.

A task manager of a session is responsible to run a modified heuristic algorithm to plan the topology of the ALM. To utilize spare resources in the pool, the task manager queries SOMO to obtain a list of candidates. The items of the list include not only the resource availability, but also its network coordinates and its bandwidth. When the plan is drawn, the task manager goes out to contact the helping peers to reserve their usages. Competing tasks will resolve their contentions purely by their respective priorities.

For ALM, there exist several different criteria for optimization, like bandwidth bottleneck, maximal latency, or variance of latencies. Maximal latency of all members is used herein as the main objective of tree building algorithms since it can greatly affect the perception of end users. Each node has a bound on the number of communication sessions it can handle, which is called 'degree' herein. This may due to the limited access bandwidth or workload of end systems. The optimization is performed so that the most resource hungry task is serviced by the most resource available machines in the peer-to-peer system.

A definition for a QoS for one given session can be formally stated as follows:

Definition 1. Degree-bounded, minimal height tree problem (DB-MHT). Given an undirected complete graph G(V,E), a degree bound $d_{bound}(v)$ for each $v \in V$, a latency function l(e) for each edge $e \in E$. Find a spanning tree T of G such that for each $v \in T$, degree of v satisfies $d(v) \leq d_{bound}(v)$ and the height of T (measured as aggregated latency from the root) is minimized.

Using the resource pool, the above definition for QoS can be extended. An extended set of helper nodes H is added to the graph, where the objective is to achieve the best solution relative to an optimal plan derived without using H, by adding the least amount of helper nodes.

D.5 Scheduling a Single ALM Session

A method for scheduling a single ALM session will be discussed as will an algorithm for optimizing the single ALM session when utilizing a resource pool. The algorithm has an $O(N^3)$ performance bound and can generate a solution for hundreds of nodes in less than one second. By way of example, see the TABLE A, below, without the code in the dashed box. This algorithm, which is referred to herein as "AMCast," starts first with the root and adds it to a set of the current solution. Next, the minimum heights of the rest of the nodes are calculated by finding their closest potential parents in the solution set, subject to degree constraints. This loops back by absorbing the node with the lowest height into the solution. The process continues until all nodes are finally included in the resulting tree. To ensure that the best possible tree to start with is obtained, the algorithm can be augmented with a set of further tuning or adjustment measures. For instance, tuning or adjustment measures for approximating a globally optimal algorithm can include adjusting the tree with a set of heuristic moves. These moves include: (a) finding a new parent for the highest node; (b) swapping the highest node with another leaf node; and (c) swapping the sub-tree whose root is the parent of the highest node with another sub-tree.

In searching for beneficial helper nodes, the algorithm includes two considerations: (1) the time to trigger the search; and (2) the criteria to judge an addition. The general mechanism is described by the pseudo-code in the box labeled "Section A" in the Table A, below:

TABLE A

```
ALM(r, V) {           // V==M(s), r is the root
  for all v∈V          // initialization
    height(v)=l(r, v); parent(v)=r
  T=(W={r}, Link={ })
  while (W<V) {         // loop until finish
    find u∈{V−W} s.t. height(u) is minimum
=========Section A=====================
    if (d(parent(u))==d_bound(parent(u)−1)
      h=find_helper(u)
    if h≠NULL {         // integrate the helper node
      W+={h}; Link+={h, parent(u)};
      W+={u}; Link+={u, h};
    } else
=======================================
      W+={u}; Link+={u, parent(u)};
    for all v∈{V−W} {   // re-adjust the height
      height(r)=∞
      for all w∈W
        if d(w)<d_bound(w) && height(v)>height(w)+l(w, v)
          height(v)=height(w)+l(w, v); parent(v)=w
    }
  }
  adjust(T)
  return T
}
```

Let u be the node that the AMCast algorithm is about to add to the solution and parent(u) be its parent. When parent(u)'s free degree is reduced to one, the search is triggered for an additional node h. If such h exists in the resource pool, then h becomes u's parent instead and replaces u to be the child of the original parent(u). Different versions vary only on the selection criteria of h, but this class of optimization can be referred to as the critical node algorithm. "Critical" here means that, for a particular node, this is the last opportunity to improve upon the original algorithm.

Different algorithms can be used to search for h. A first variation of the algorithm is to find an additional node closest to the parent node and with an adequate degree (e.g., '4' can be used). Let l(a, b) be latency between two arbitrary nodes a and b. The following heuristic yields even better results as shown in Table B:

TABLE B

| l(h, parent(u))+max(l(h, v)) is minimum | |
|---|---|
| where v satisfies parent (v) = parent (u) | && \\ condition 1 |
| $d_{bound}(h) \geq 4$ && | \\ condition 2 |
| l(h, parent(u))<R | \\ condition 3 |

Figure 12:
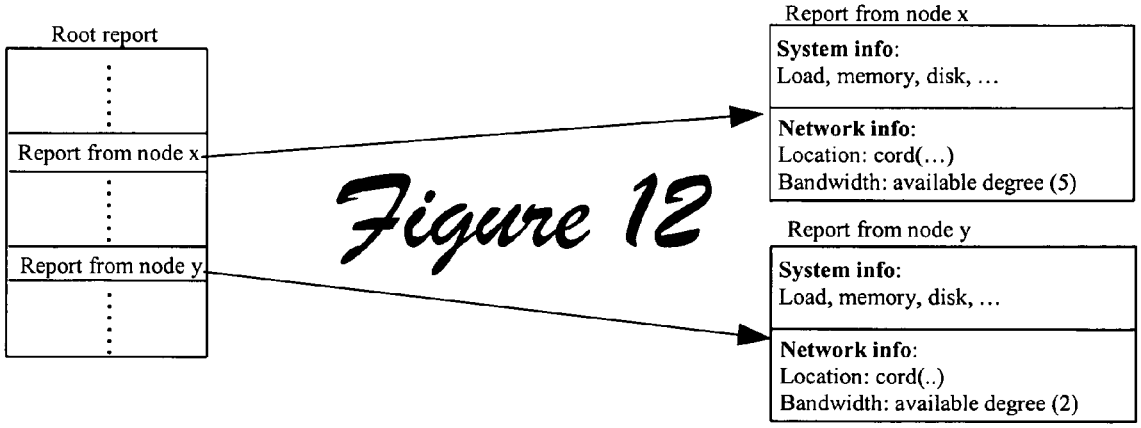
FIG. 12 depicts a SOMO report structure for scheduling a single application level multicasting session, where each node publishes their network coordinates as well as bandwidth constraints in their reports to SOMO.

Here, v can be one of u's siblings. The idea here is that since all such v will potentially be h's future children, l(h, parent (u))+max (l(h, v)) is most likely to affect the potential tree height after h's joining (condition 1). Such a helper node should have adequate degree (condition 2). Finally, to avoid "junk" nodes that are far away even though their degrees are high, we impose a radius R: h must lie within R away from parent(u) (condition 3). The input parameters necessary to execute the procedure include the network coordinates so that we can calculate latency between an arbitrary pair, as well as the degrees of each node. This is made available by letting each node publish their network coordinates as well as bandwidth constraints in their reports to SOMO as is shown in FIG. 12—which is a visualization of the SOMO report that a scheduler is using. Thus, each node has a particular load (CPU cycles available), a particular memory capability (RAM, disk space, cache), and also has some network information like where the node is (IP address) and how much available bandwidth the node has. FIG. 10a shows the collection of data for use in a SOMO report such as is shown in FIG. 12.

D.6 Optimizing Multiple ALM Sessions

While the preceding section described the stand-alone scheduling algorithm for one ALM session, this section discusses how to deal with multiple active sessions, where higher priority sessions are proportionally assigned with more resources, and the utilization of the resource pool as a whole is maximized.

All the sessions may start and end at random times. Each session has an integer valued priority between 1 and 3. A priority 1 session is the highest class. The number of maximum simultaneous sessions varies from 10 to 60 and each session has non-overlapping member set of size 20. Thus, when there are 60 active sessions, all nodes will belong to at least one session. That is, the fraction of original members of active sessions varies from 17% to 100%. Counting helper nodes, a session typically employ more than the original members. Also, nodes with larger degrees may be involved in more than one session.

The principle underlying this approach to optimizing multiple ALM sessions is somewhat analogous to a well-organized society: as long as global, on-time and trusted knowledge is available, it may be best to leave each task to compete for resources with their own credentials (i.e., their respective priorities). This purely market-driven model allows the goal to be accomplished without the need of a global scheduler of any sort.

Setting the appropriate priorities at nodes involved in a session takes extra consideration. In a collaborative P2P environment, if a node needs to run a job which includes itself as a member, it is fair to have that job be of highest priority in that node. Therefore, for a session s with priority L, it has the highest priority (i.e., the $1^{st}$ priority) for nodes in M(s), and L elsewhere (i.e., for any helper nodes that lie outside M(s)). This ensures that each session can be run, with a lower bound corresponding to the AMCast+adju algorithm. The upper bound is obtained assuming s is the only session in the system (i.e., Leafset+adju).

As before, the root of an ALM session is the task manager, which performs the planning and scheduling of the tree topology. Each session uses the Leafset+adjustment algorithm to schedule completely on its own, based on system resource information provided by SOMO. For a session with priority L, any resources that are occupied by tasks with lower priorities than L are considered available for its use. Likewise, when an active session loses a resource in its current plan, it will need to perform scheduling again. Each session will also rerun scheduling periodically to examine if a better plan, using recently freed resources, is better than the current one and switch to it if so.

To facilitate SOMO to gather and disseminate resource information so as to aid the planning of each task manager, as before each node publishes its information such as network coordinates in its report to SOMO. However, its degree is broken down into priorities taken by active sessions. This is summarized in the following two examples in Degree Table C:

DEGREE TABLE C

| $D_{bound}(x)$ | 4 | $D_{bound}(y)$ | 2 |
|---|---|---|---|
| x.dt[1] | $2(S_4)$ | y.dt[1] | $2(S_5)$ |
| x.dt[2] | 0 | y.dt[2] | 0 |
| x.dt[3] | $1(S_{12})$ | y.dt[3] | 0 |
| x's degree table | | y's degree table | |

In Degree Table C, the degree tables of two nodes are shown. x's total degree is 4, and is taken by session s4 for 2 degrees, and s12 by another one degree, leaving x with one free degree. y on the other hand, has only two degrees and both of them are taken by session s5. The degree tables are updated whenever the scheduling happens that affects a node's degree partition. Degree tables, as mentioned earlier, are gathered through SOMO and made available for any running task to query. Degree Table C shows that it is possible for a machine to partition itself among different streams of ALM sessions so that some things can be done simultaneously by dividing up the bandwidth. As such, Degree Table C shows how many total degrees can be had and how many total capabilities may be had by dividing the capabilities among different jobs so that they can be scheduled as different priority sessions.

When there are more sessions in application level multicasting and overall resources become scarce, performance decreases. Higher priority tasks, however, are able to sustain much better performance than the lower ones. Also, lower priority tasks lose more helper nodes when resources are under intense competition.

D.7 Resource Pools with ALM Sessions

To create a resource pool, it is inevitable that a hierarchical structure is adopted to ensure timely aggregation. For instance, in a two-level architecture in which IP-level multicasting is employed to gather statistics in one location, the result can then be aggregated to a central site. The ingredients are discussed herein to make a wide-area resource pool feasible, namely (1) the combination of the self-organizing capability of P2P DHT and (2) an in-system, self-scaling monitoring infrastructure.

D.8 Optimizing ALM Using Resource Pools

ALM is a favorable application for P2P DHTs. To optimize ALM, however, a resource pool should be utilized. Given a resource pool, an optimization can be made of a one single ALM session as well as an optimization of multiple simultaneous ALM sessions in a hands-off, market-driven approach. Note, however, that ALM is only one of the applications for P2P resource pool. Nevertheless, for a methodology that is more distributed than centralized matchmaking mechanisms, a two-step approach is advocated: (1) application specific per task scheduling; and (2) combined with market-driven fair competition by coordinating among tasks.

E. Exemplary Computer Environment for Implementing One P2P Participant

The data overlay described in Section A, above, is a data structure that can be spread out over multiple machines and possibly over other infrastructure in a P2P system. Thus, each of the participants in the P2P system can be viewed as implementing a part of the data overlay. To achieve this effect, each participant can store the necessary code and data to create the data overlay and to interact with it. This code and data can be stored in the volatile and/or non-volatile memory of each participant (to be described below).

Figure 13:
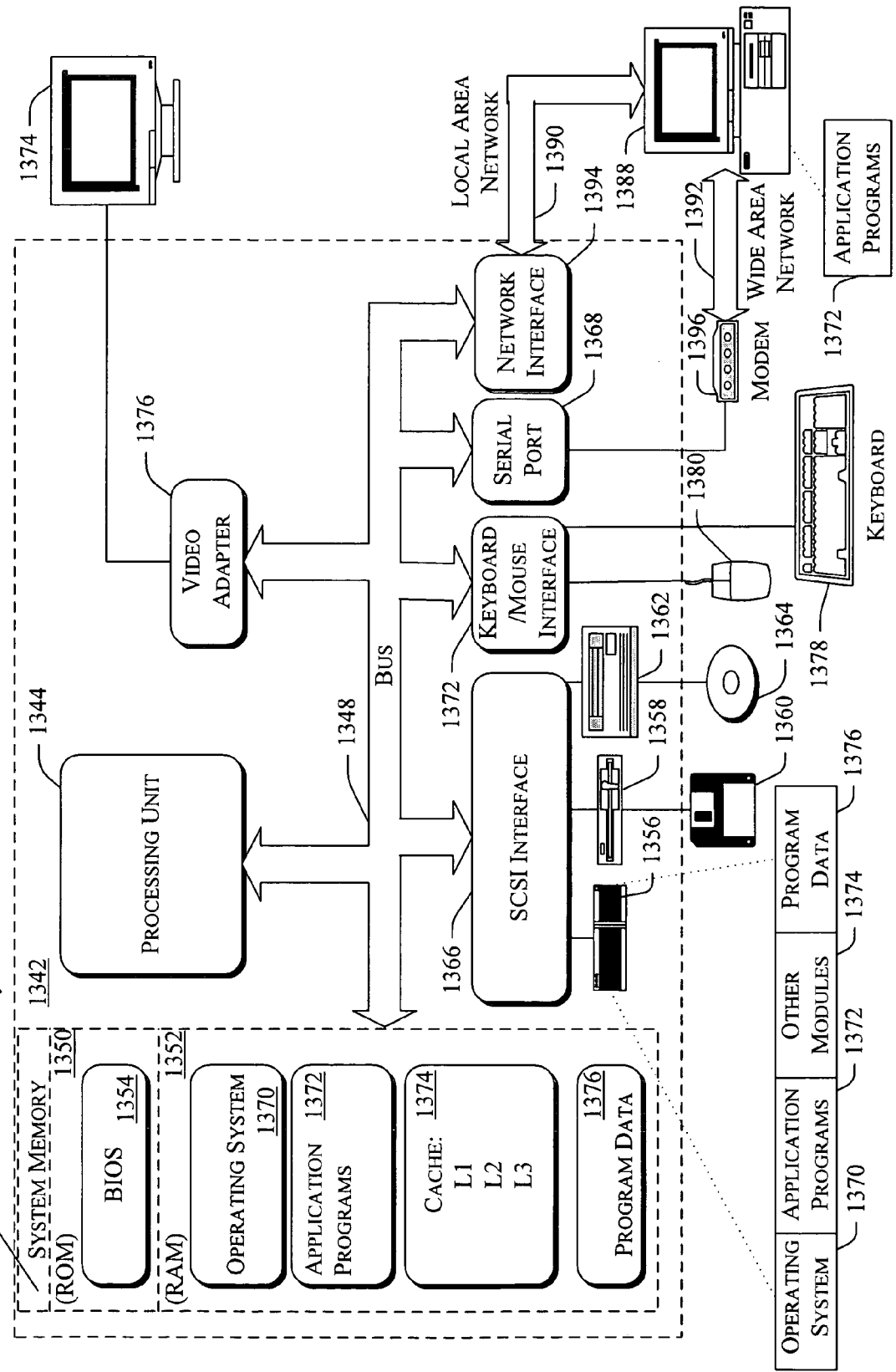
FIG. 13 shows an exemplary computer used to implement a participant of a P2P system, where the P2P system includes a data overlay built on top of its DHT.

For example, FIG. 13 shows a high level view of one exemplary P2P participant as a computer 1342. This computer 1342 corresponds to a general purpose computer or server type computer and an associated display device 1374. However, the computer 1342 can be implemented using other kinds of computing equipment. For example, although not shown, the computer 1342 can include hand-held or laptop devices, set top boxes, mainframe computers, etc.

The exemplary computer 1342 can be used to implement the processes described herein. Computer 1342 includes one or more processors or processing units 1344, a system memory 1346, and a bus 1348 that couples various system components including the system memory 1346 to processors 1344. One or more stores in the computer 1342 can be used to store the code and data used to implement part of a data overlay, such as part of the SOMO tree structure.

The bus 1348 represents one or more of any of several types of bus structures, including a memory bus or memory controller, a peripheral bus, an accelerated graphics port, and a processor or local bus using any of a variety of bus architectures. The system memory 1346 includes read only memory (ROM) 1350 and random access memory (RAM) 1352. A basic input/output system (BIOS) 1354, containing the basic routines that help to transfer information between elements within computer 1342, such as during start-up, is stored in ROM 1350.

Computer 1342 further includes a hard disk drive 1356 for reading from and writing to a hard disk (not shown), a magnetic disk drive 1358 for reading from and writing to a removable magnetic disk 1360, and an optical disk drive 1362 for reading from or writing to a removable optical disk 1364 such as a CD ROM or other optical media. The hard disk drive 1356, magnetic disk drive 1358, and optical disk drive 1362 are connected to the bus 1348 by an SCSI interface 1366 or some other appropriate interface. The drives and their associated computer-readable media provide nonvolatile storage of computer-readable instructions, data structures, program modules and other data for computer 1342. Although the exemplary environment described herein employs a hard disk, a removable magnetic disk 1360 and a removable optical disk 1364, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1356, magnetic disk 1360, optical disk 1364, ROM 1350, or RAM 1352, including an operating system 1370, one or more application programs 1372 (such as the Web request trace application 140), cache/other modules 1374, and program data 1376. The operating system 1370 can include a Web request event tracing tool as described herein (such as the trace infrastructure 144). A user may enter commands and information into computer 1342 through input devices such as a keyboard 1378 and a pointing device 1380. Other input devices (not shown) may include a microphone, joystick, game pad, satellite dish, scanner, or the like. These and other input devices are connected to the processing unit 1344 through an interface 1382 that is coupled to the bus 1348. A monitor 1384 or other type of display device is also connected to the bus 1348 via an interface, such as a video adapter 1386. In addition to the monitor, personal computers typically include other peripheral output devices (not shown) such as speakers and printers.

Computer 1342 commonly operates in a networked environment using logical connections to one or more remote computers, such as a remote computer 1388. The remote computer 1388 may be a personal computer, another server, a router, a network PC, a peer device or other common network node, and typically includes many or all of the elements described above relative to computer 1342. The logical connections depicted in FIG. 13 include a local area network (LAN) 1390 and a wide area network (WAN) 1392. Such networking environments are commonplace in offices, enterprise-wide computer networks, intranets, and the Internet.

When used in a LAN networking environment, computer 1342 is connected to the local network through a network interface or adapter 1394. When used in a WAN networking environment, computer 1342 typically includes a modem 1396 or other means for establishing communications over the wide area network 1392, such as the Internet. The modem 1396, which may be internal or external, is connected to the bus 1348 via a serial port interface 1368. In a networked environment, program modules depicted relative to the personal computer 1342, or portions thereof, may be stored in the remote memory storage device. It will be appreciated that the network connections shown are exemplary and other means of establishing a communications link between the computers may be used.

Generally, the data processors of computer 1342 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer. Any of the functions described herein can be implemented using software, firmware (e.g., fixed logic circuitry), manual processing, or a combination of these implementations. The term "logic" or "module" as used herein generally represents software, firmware, or a combination of software and firmware. For instance, in the case of a software implementation, the term "logic" or "module" represents program code that performs specified tasks when executed on a processing device or devices (e.g., CPU or CPUs). The program code can be stored in one or more computer readable memory devices. The illustrated separation of logic and modules into distinct units may reflect an actual physical grouping and allocation of such software and/or hardware, or can correspond to a conceptual allocation of different tasks performed by a single software program and/or hardware unit. The illustrated logic and modules can be located at a single site (e.g., as implemented by a single processing device), or can be distributed over plural locations.

H. CONCLUSION

To create a P2P resource pool, the self-organizing capability of P2P DHT is combined with a self-scaling, hierarchical in-system monitoring infrastructure. To achieve self-scaling and robustness, this infrastructure must be a logical hierarchy established in the virtual space created by DHT, and then mapped onto participants. It has been described herein how SOMO combined with DHT effectively creates a resource pool.

The power of the resource pool can be utilized to take advantage of the on-time and accurate newscast via SOMO, install an application-specific scheduler per each task and then take a hands-off, market-driven approach to coordinate among tasks with fair competition.

Implementations were described for building a data structure on top of a DHT in a P2P system. A specific hierarchical tree structure was specifically described for disseminating information into the P2P system and for collecting information from the P2P system.

Certain operations were described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Further, a number of examples will be presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    building a data overlay as a data structure on top of a logical space included in a distributed hash table (DHT) for a peer-to-peer system; wherein the logical space includes a plurality of DHT nodes having an associated plurality of DHT zones;
    building, in the data overlay, a topology of a tree having a plurality of levels each including one or more tree nodes associated with respective said DHT nodes,
    wherein:
        the first level of the tree includes a single tree node having a single tree node zone corresponding to the entire span of the logical space of the DHT and being logically divided into a plurality of said tree node zones respectively corresponding to:
            the tree nodes at each level of the tree; and
            parts of the logical space of the DHT;
        each said tree node includes a key member which identifies a key associated with its respective tree node zone;
    mapping a plurality of machines to the logical space of the DHT,
    wherein:
        each machine corresponds to one or more of more of the tree node zones;
        each machine selects as its representative node, from the one or more tree node zones corresponding thereto, the tree node corresponding to the largest size tree node zone;
            each said representative node selects as its parent node another said representative node that is the representative node for an adjacent said tree node zone that has a larger size; and
        wherein:
            the single tree node zone that corresponds to the entire span of the logical space of the DHT is evenly divided into k tree node zones;
            k is the number of tree nodes at the first level of the tree; and
            the j-th tree node at level i of the tree has a tree node zone having:
                a size of $[j/k^i, (j+1)/k^i]$; and
                a key of $(2j+1)/12k^i$; where $(0 <= j < 2^i)$.

2. The method as defined in claim 1, further comprising:
    gathering metadata at each said machine;
    sending the metadata gathered at said machine to the corresponding representative node;
    gathering the metadata received by each said representative node; and
    sending the metadata gathered by each said representative node to the corresponding parent node; and
    gathering metadata received at the single tree node at the first level of the tree.

3. The method as defined in claim 2, further comprising:
    processing the data gathered at the single tree node at the first level of the tree; and
    sending the processed data from the single tree node at the first level of the tree to each said machine via the respective parent and representative nodes.

4. The method as defined in claim 3, wherein:
    the metadata comprises information regarding the operation of each said machine; and
    the processed data comprises instructions that can govern the operation of each said machine.

5. The method as defined in claim 1, wherein:
    each said key has a value that is a function of coordinates that identify the center of the respective tree node zone;
    the i-th level of the tree contains $k^i$ tree nodes; and
    the tree node zone of each tree node has a size of $1/k^i$.

6. The method as defined in claim 1, further comprising computing, for each said machine, the respective keys of the respective representative and parent nodes for the machine.

7. The method as defined in claim 6, wherein the computing the respective keys further comprises obtaining information, with the machine, using a look up in the DHT, wherein the machine uses the information with the key of the corresponding said representative node to establish communication with the machine corresponding to the representative node.

8. The method as defined in claim 1, further comprising:
    receiving, at each said machine, a heartbeat transmission from each said machine in an adjacent said tree node zone; and
    when any said heartbeat transmission is not timely received, accounting for the absence of the corresponding said machine in the adjacent said tree node zone by:
        repeating the providing of the DHT;
        repeating the building of the data overlay as the data structure on top of the logical space of the DHT;
        repeating the building of the multilevel tree in the rebuilt data overlay; and
        repeating the mapping of the plurality of machines to the logical space of the DHT.

9. The method as defined in claim 1, wherein each said representative node and each said parent node is selected as an optimization function of availability of resources.

10. The method as defined in claim 9, wherein the optimization function is based upon criteria selected from the group consisting of network coordinates, bandwidth bottleneck, maximal latency, and variance of latencies, whereby the most resource hungry task is performed by the most resource available machines in the peer-to-peer system.

11. The method as defined in claim 1, wherein:
the DHT governs the insertion and retrieval of objects into and from the peer-to-peer system; and
the logical space includes a plurality of DHT nodes having an associated plurality of DHT zones; and
the data overlay of the DHT is built by:
associating objects in the data structure with the DHT nodes; and
establishing links between the objects in the data structure.

12. The method according to claim 11, wherein each link includes:
a first field that provides a hardwired pointer that points from a first object to a second object; and
a second field that provides a soft-state pointer that points from the first object to a DHT node which hosts the second object.

13. The method according to claim 11, wherein the building of the data overlay makes use of:
a first primitive for setting a reference that establishes a pointer to an object in the DHT;
a second primitive for returning an object referenced by a pointer; and
a third primitive for deleting an object referenced by a pointer.

14. The method according to claim 1, wherein each tree node in the data overlay includes an operation member which defines an operation that is to be performed on data that is passed through the tree node.

15. The method according to claim 1, wherein each tree node in the data overlay includes a report member which defines a report type that is to be generated using the tree node.

16. The method according to claim 1, wherein:
the first level of the tree includes the tree node that is a root node for the tree; and
the root node corresponds to the tree node zone that corresponds to the entire span of the logical space of the DHT.

17. A computer readable store including machine readable instructions for implementing the building of objects in the data overlay according to the method of claim 11.

18. A computer readable store having stored thereon a data overlay produced according to the method of claim 1.

19. A computer readable store having stored thereon a data structure that comprises a data overlay as a data structure on top of a logical space included in a DHT for a peer-to-peer system, wherein:
the DHT governs the insertion and retrieval of objects into and from a peer-to-peer system;
the logical space includes a plurality of DHT nodes having an associated plurality of DHT zones;
the data overlay of the DHT is built by:
associating objects in the data structure with the DHT nodes; and
establishing links between the objects in the data structure;
the data overlay has a topology of a tree that includes a plurality of levels;
the tree includes a plurality of tree nodes associated with respective said DHT nodes;
the tree nodes include a root node having a tree node zone corresponding to the logical space of the DHT;
the tree node zone of the root node is logically divided into a plurality of tree node zones respectively corresponding to:
the number of tree nodes at each level of the tree; and
a part of the logical space of the distributed hash table;
each said tree node includes a key member which identifies a key associated with its respective tree node zone;
the logical space of the DHT is mapped to a plurality of machines;
each machine corresponds to one or more of more of the tree node zones;
each machine selects as its representative node, from the one or more tree node zones corresponding thereto, the tree node corresponding to the largest size tree node zone;
each said representative node selects as its parent node another said representative node that is the representative node for an adjacent said tree node zone that has a larger size; and
wherein:
the tree node zone of the root node is evenly divided into k tree node zones, where k is the number of tree nodes at the first level of the tree; and
the j-th tree node at level i of the tree has a tree node zone having:
a size of $[j/k^i, (j+1)/k^i]$; and
a key of $(2j+1)/12k^i$; where $(0<=j<2^i)$.

20. The computer readable store as defined in claim 19, wherein:
each said key has a value that is a function of coordinates that identify the center of the respective tree node zone;
the i-th level of the tree contains $k^i$ tree nodes; and
the tree node zone of each tree node has a size of $1/k^i$.

21. The computer readable store as defined in claim 19, wherein:
the DHT governs the insertion and retrieval of objects into and from the peer-to-peer system;
the logical space includes a plurality of DHT nodes having an associated plurality of DHT zones; and
the data overlay of the DHT:
has objects in the data structure associated with the DHT nodes; and
has links established between the objects in the data structure.

22. The computer readable store as defined in claim 19, wherein each link includes:
a first field that provides a hardwired pointer that points from a first object to a second object; and
a second field that provides a soft-state pointer that points from the first object to a DHT node which hosts the second object.

23. The computer readable store as defined in claim 19, wherein:
a first primitive sets a reference that establishes a pointer to an object in the DHT;
a second primitive returns an object referenced by a pointer; and
a third primitive deletes an object referenced by a pointer.

24. The computer readable store as defined in claim 19, wherein each tree node in the data overlay includes an operation member which defines an operation that can be performed on data that is passed through the tree node.

25. The computer readable store as defined in claim 19, wherein each tree node in the data overlay includes a report member which defines a report type that is to be generated using the tree node.

26. The computer readable store as defined in claim 19, wherein:
the first level of the tree includes the tree node that is a root node for the tree; and
the root node corresponds to the tree node zone that corresponds to the entire span of the logical space of the DHT.

27. A peer-to-peer system including a plurality of machines interacting in peer-to-peer fashion, comprising:
a logical space of a DHT that includes a plurality of DHT nodes having a plurality of associated DHT zones, wherein the DHT governs the insertion and retrieval of objects into and from the peer-to-peer system;
a data overlay as a data structure on top of the logical space of the DHT, wherein:
the data overlay of the DHT:
has objects in the data structure associated with the DHT nodes; and
has links established between the objects in the data structure;
the data overlay has a topology of a tree that includes a plurality of levels and includes a plurality of tree nodes associated with respective said DHT nodes;
the tree nodes include a root node having a tree node zone corresponding to the logical space of the DHT;
the tree node zone of the root node is logically divided into a plurality of tree node zones respectively corresponding to:
the number of tree nodes at each level of the tree; and
a part of the logical space of the distributed hash table;
each said tree node includes a key member which identifies a key associated with its respective tree node zone;
the logical space of the DHT is mapped to a plurality of machines;
each machine corresponds to one or more of more of the tree node zones;
each machine selects as its representative node, from the one or more tree node zones corresponding thereto, the tree node corresponding to the largest size tree node zone;
each said representative node selects as its parent node another said representative node that is the representative node for an adjacent said tree node zone that has a larger size; and
wherein:
the tree node zone of the root node is evenly divided into k tree node zones, where k is the number of tree nodes at the first level of the tree; and
the j-th tree node at level i of the tree has a tree node zone having:
a size of $[j/k^i, (j+1)/k^i]$; and
a key of $(2j+1)/12k^i$; where $(0<=j<2^i)$.

28. The system according to claim 27, further comprising routing logic configured to route data through the data overlay by passing the data through the tree nodes.

29. The system according to claim 28, wherein the routing logic is configured to route the data through the data overlay by gathering data from DHT nodes and passing the data up through the tree nodes to the root node of the tree.

30. The system according to claim 28, wherein the routing logic is configured to route data through the data overlay by disseminating data from the root node of the tree, through the tree nodes, to the DHT nodes.

31. An apparatus for building a peer-to-peer system, the apparatus comprising:
means for building a data overlay as a data structure on top of a logical space included in a distributed hash table (DHT) for a peer-to-peer system;
wherein:
the DHT governs the insertion and retrieval of objects into and from a peer-to-peer system;
the logical space includes a plurality of DHT nodes having an associated plurality of DHT zones; and
the data overlay of the DHT is built by:
associating objects in the data structure with the DHT nodes; and
establishing links between the objects in the data structure;
means for building a topology of a tree in the data overlay, the tree having a plurality of levels and including a plurality of tree nodes associated with respective said DHT nodes, wherein:
the tree nodes include a root node having a tree node zone corresponding to the logical space of the DHT;
the tree node zone of the root node is logically divided into a plurality of tree node zones respectively corresponding to:
the number of tree nodes at each level of the tree; and
a part of the logical space of the distributed hash table;
each said tree node includes a key member which identifies a key associated with its respective tree node zone;
means for mapping a plurality of machines to the logical space of the DHT, wherein
each machine corresponds to one or more of more of the tree node zones;
means for selecting as its representative node, from the one or more tree node zones corresponding to a respective said machine, the tree node corresponding to the largest size tree node zone;
means for selecting for each said representative node as its parent node another said representative node that is the representative node for an adjacent said tree node zone that has a larger size; and
wherein:
the tree node zone of the root node is evenly divided into k tree node zones, where k is the number of tree nodes at the first level of the tree; and
the j-th tree node at level i of the tree has a tree node zone having:
a size of $[j/k^i, (j+1)/k^i]$; and
a key of $(2j+1)/12k^i$; where $(0<=j<2^i)$.

32. The apparatus as defined in claim 31, further comprising:
means for gathering metadata at each said machine;
means for sending the metadata gathered at said machine to the corresponding representative node;
means for gathering the metadata received by each said representative node; and
means for sending the metadata gathered by each said representative node to the corresponding parent node; and
means for gathering metadata received at the single tree node at the first level of the tree.

33. The apparatus as defined in claim 32, further comprising:
- means for processing the data gathered at the single tree node at the first level of the tree; and
- means for sending the processed data from the single tree node at the first level of the tree to each said machine via the respective parent and representative nodes.

34. The apparatus as defined in claim 33, wherein:
- the metadata comprises information regarding the operation of each said machine; and
- the processed data comprises instructions that can govern the operation of each said machine.

35. The apparatus as defined in claim 31, further comprising:
- means for receiving at a machine a heartbeat transmission from each said machine in an adjacent said tree node zone; and
- means, when any said heartbeat transmission is not timely received, for accounting for the absence of the corresponding said machine in the adjacent said tree node zone by:
  - repeating the providing of the DHT;
  - repeating the building of the data overlay as the data structure on top of the logical space of the DHT; and
  - repeating the building of the multilevel tree in the rebuilt data overlay.

36. The apparatus as defined in claim 35, wherein:
- the means for accounting further comprises means for repeating the mapping of the plurality of machines to the logical space of the DHT; and
- the apparatus further comprises means for selecting each said representative node and each said parent node as an optimization function of availability of resources of the corresponding machines.

37. The apparatus as defined in claim 36, wherein the optimization function is based upon criteria selected from the group consisting of network coordinates, bandwidth bottleneck, maximal latency, and variance of latencies, whereby the most resource hungry task is performed by the most resource available machines in the peer-to-peer system.

38. The apparatus as defined in claim 31, further comprising means for routing data through the data overlay by passing the data through the tree nodes.

39. The apparatus as defined in claim 38, wherein the routing means includes means for routing the data through the data overlay by gathering data from DHT nodes and passing the data up through the tree nodes to the root node of the tree.

40. The apparatus as defined in claim 38, wherein the routing means includes means for routing data through the data overlay by disseminating data from the root node of the tree, through the tree nodes, to the DHT nodes.

* * * * *